(12) United States Patent
Huang et al.

(10) Patent No.: US 8,958,169 B1
(45) Date of Patent: Feb. 17, 2015

(54) DATA STORAGE DEVICE RE-QUALIFYING STATE ESTIMATOR WHILE DECELERATING HEAD

(71) Applicant: Western Digital Technologies, Inc., Irvine, CA (US)

(72) Inventors: Yanan Huang, Torrance, CA (US); Orhan Beker, Dove Canyon, CA (US); Yiqian Li, Irvine, CA (US); Xiao Ma, Irvine, CA (US); Wenlin Zhang, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/302,088

(22) Filed: Jun. 11, 2014

(51) Int. Cl.
*G11B 21/02* (2006.01)
*G11B 5/55* (2006.01)

(52) U.S. Cl.
CPC .................................. *G11B 5/5547* (2013.01)
USPC ............................................................ 360/75

(58) Field of Classification Search
None
See application file for complete search history.

(56) References Cited

U.S. PATENT DOCUMENTS

| | | |
|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |

(Continued)

*Primary Examiner* — K. Wong (57) ABSTRACT

A data storage device is disclosed comprising a disk comprising a plurality of tracks defined by servo sectors, a head, and a servo controller configured to servo the head over the disk based on an estimated state generated by a state estimator. The servo controller is configured to execute a seek operation to seek the head over the disk and recover from a servo fault during the seek operation by generating an initial state estimate of the head at the beginning of the servo fault, and decelerating the head open-loop using a model-based deceleration control in response to the initial state estimate. While decelerating the head, the state estimator is re-qualified before the head reaches zero velocity, and after re-qualifying the state estimator and before the head reaches zero velocity, a seek operation is executed to seek the head to a target track closed-loop using the state estimator.

14 Claims, 5 Drawing Sheets

(56) References Cited

U.S. PATENT DOCUMENTS

| | | |
|---|---|---|
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,771,440 B2 | 8/2004 | Smith |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,486,471 B2 | 2/2009 | DeRosa |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |

(56) References Cited

U.S. PATENT DOCUMENTS

| | | |
|---|---|---|
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,599,144 B2 * | 10/2009 | Suh et al. .................. 360/77.02 |
| 7,602,572 B2 | 10/2009 | Abrishamchian et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

DATA STORAGE DEVICE RE-QUALIFYING STATE ESTIMATOR WHILE DECELERATING HEAD

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo controller to control the actuator arm as it seeks from track to track.

Figure 1:
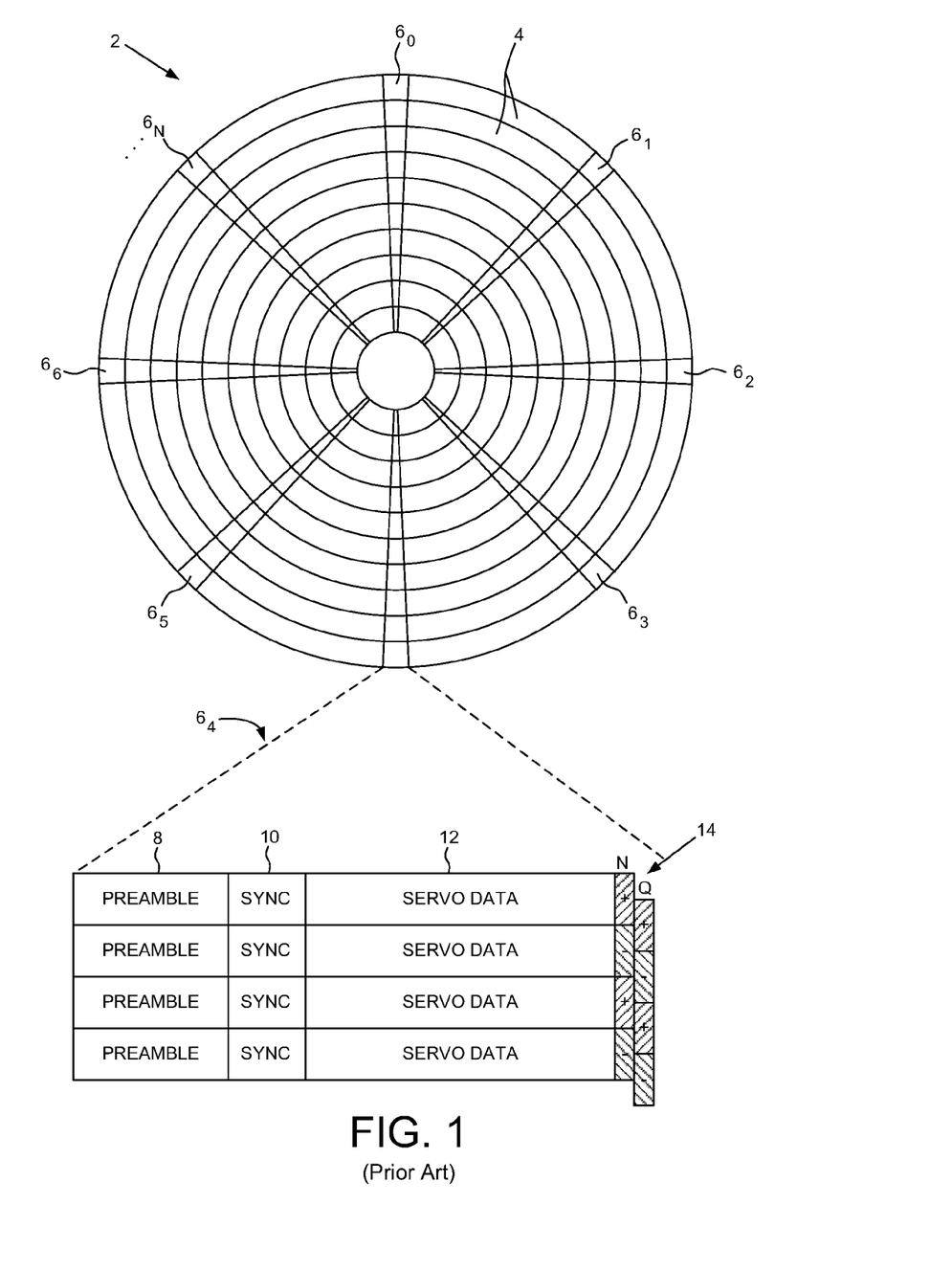
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

When seeking the head across the disk, a servo fault may occur due to loss of synchronization to the servo sectors, a large deviation in the estimated servo states of the servo controller, detecting instability of the servo controller, etc. When a servo fault is detected, the prior art quickly decelerates the head to zero velocity using, for example, a double integrator model-based open loop control. After the head reaches zero velocity, a state estimator is re-qualified based on the servo sectors, and the seek is completed.

Figure 4A:
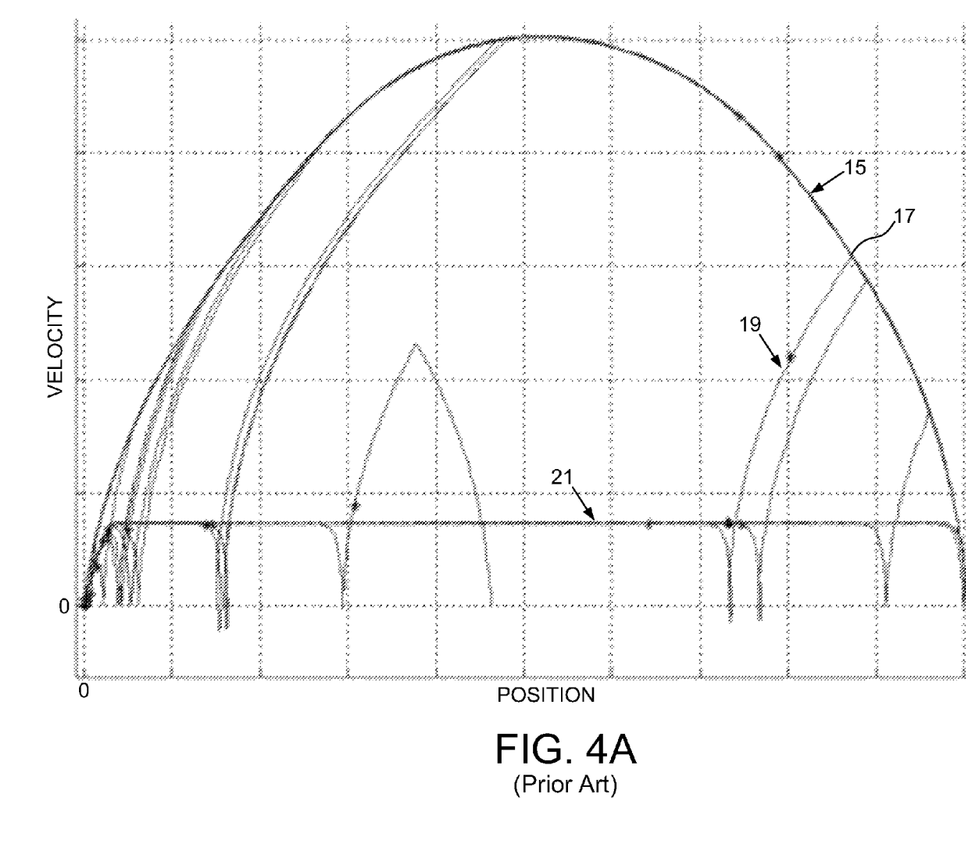
FIG. 4A shows a prior art technique for recovering from a servo fault by decelerating the head to zero using a steep deceleration trajectory that may excite resonances in the servo controller which can increase acoustic noise, or cause other issues, such as poor seek settle, command time-out, or even an off-track write.

FIG. 4A illustrates an example velocity/position phase plane for a seek operation executed by a prior art servo controller. In this example, the seek is performed using a just-in-time (JIT) control which typically reduces acoustic noise as compared to a minimum-time seek control. If a servo fault does not occur, the servo states will follow the arcuate trajectory 15 shown in FIG. 1. If a servo fault occurs, for example, when the head reaches position 17, the servo controller quickly decelerates the head to zero using a minimum-time seek control such that the servo states follow the steep deceleration trajectory 19. After the head reaches zero velocity, the servo controller re-qualifies the state estimator, and then completes the seek after accelerating to a relatively low coast velocity 21. Decelerating the head to zero velocity in minimum time when a servo fault is detected such that the servo states follow a steep deceleration trajectory may excite resonances in the servo controller which can increase acoustic noise, or cause other issues, such as poor seek settle, command time-out, or even an off-track write. In addition, a significant error in the estimated servo states used to initialize the double integrator model-based open loop control may cause a high-speed runaway condition which may damage the head due to the actuator arm colliding with a crash stop.

DETAILED DESCRIPTION

Figure 2A:
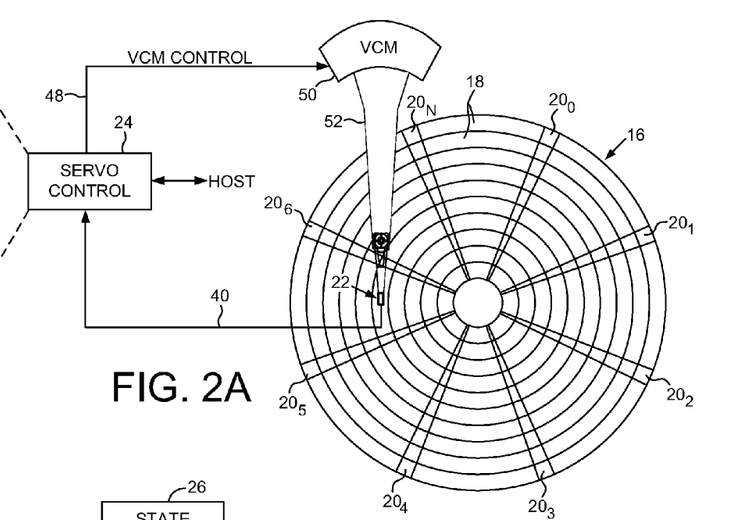
FIG. 2A shows a data storage device in the form of a disk drive according to an embodiment comprising a head actuated over a disk.
Figure 2B:
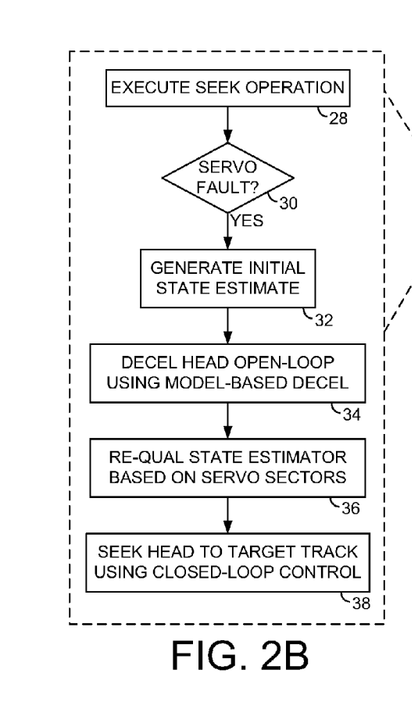
FIG. 2B is a flow diagram according to an embodiment wherein a servo controller recovers from a servo fault by re-qualifying a state estimator while decelerating the head.
Figure 2C:
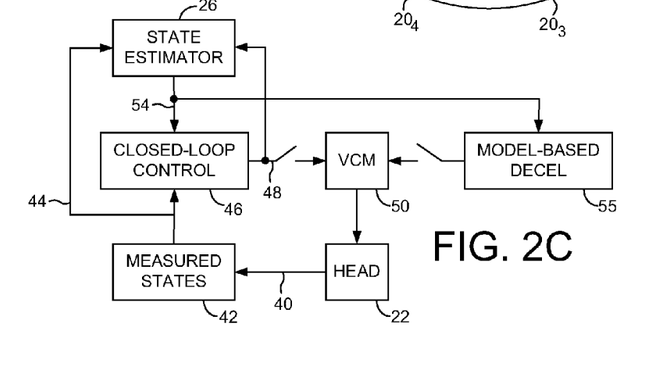
FIG. 2C shows a servo controller according to an embodiment comprising a model-based open-loop deceleration control used when recovering from a servo fault.

FIG. 2A shows a data storage device in the form of a disk drive according to an embodiment comprising a disk 16 comprising a plurality of tracks 18 defined by servo sectors $20_0$-$20_N$, a head 22, and a servo controller 24 configured to servo the head over the disk based on an estimated state generated by a state estimator 26 (FIG. 2C). The servo controller 24 is configured to execute the flow diagram of FIG. 2B wherein a seek operation is executed to seek the head over the disk (block 28). When a servo fault occurs during the seek operation (block 30), a recover operation is executed by generating an initial state estimate of the head at the beginning of the servo fault (block 32), and decelerating the head open-loop using a model-based deceleration control in response to the initial state estimate (block 34). While decelerating the head, the state estimator is re-qualified before the head reaches zero velocity (block 36), and after re-qualifying the state estimator and before the head reaches zero velocity, a seek operation is executed to seek the head to a target track closed-loop using the state estimator (block 38).

In the embodiment of FIG. 2A and 2C, a read signal 40 emanating from the head 22 while reading the servo sectors $20_0$-$20_N$ is demodulated at block 42 to measure at least one state 44 of the servo system (e.g., the position of the head 22 relative to the disk 16). The measured state 44 is processed by a suitable closed-loop servo control 46 which generates a control signal 48 applied to a voice coil motor (VCM) 50. The VCM 50 rotates an actuator arm 52 about a pivot in order to actuate the head 22 radially over the disk during seeking and tracking operations. When servoing the head 22 over the disk 16, one or more of the servo sectors $20_0$-$20_N$ may be unreadable due, for example, to a defect on the disk 16. When a servo sector is unreadable, the state estimator 26 may generate an estimated state 54 of the head 22 based on the previous measured states 44 and the previous control signal 48 applied to the VCM 50. The estimated state 54 may be used in place of the measured state 44 in order to maintain acceptable servo performance even when one or more of the servo sectors $20_0$-$20_N$ are unreadable.

When seeking the head across the disk, a servo fault may occur due to loss of synchronization to the servo sectors, a large deviation in the estimated servo states of the servo controller, detecting instability of the servo controller, etc. When a servo fault is detected, the state estimator 26 may need to be re-qualified since the servo fault may corrupt the integrity of the state estimator 26. As described above with reference to FIG. 4A, when a servo fault occurs the prior art may quickly decelerate the head to zero velocity using, for example, a double integrator model-based open-loop control. After the head reaches zero velocity, the state estimator is re-qualified based on the servo sectors, and the seek is completed. However, decelerating the head to zero based on a steep deceleration trajectory may excite resonances in the servo controller which can increase acoustic noise, or cause other issues, such as poor seek settle, command time-out, or even an off-track write. To overcome the drawbacks of the prior art servo fault recovery technique shown in FIG. 4A, in one embodiment when a servo fault occurs the state estimator 26 is re-qualified while decelerating the head and before the velocity of the head reaches zero as described above with reference to the flow diagram of FIG. 2B.

Figure 3:
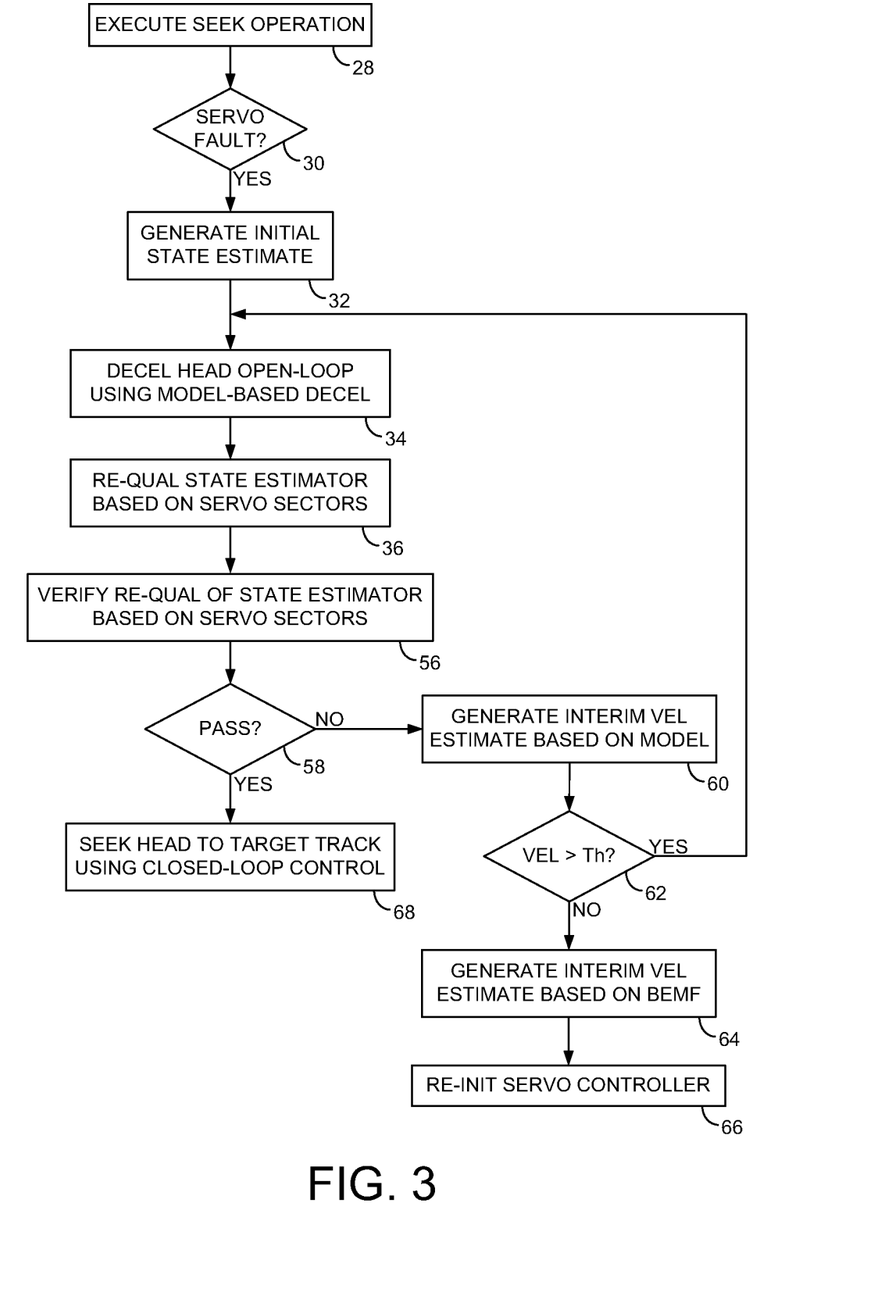
FIG. 3 is a flow diagram according to an embodiment wherein if the re-qualification of the state estimator is verified while decelerating the head during a servo fault, the servo controller seeks the head to a target track closed-loop using the state estimator.

FIG. 3 is a more detailed flow diagram according to an embodiment which extends on the flow diagram of FIG. 2B, wherein when a servo fault occurs (block 30) during a seek operation, an initial estimate state 54 is generated (block 32), for example, based on the last trusted output of the state estimator 26 before the servo fault occurred. The initial state estimate is used to decelerate the head using the model-based open loop control 55, and concurrently the state estimator is re-qualified (block 36). For example, the state estimator may be re-qualified based on the measured states 44 of the head when attempting to resynchronize to the servo sectors. After re-qualifying the state estimator, the re-qualification is verified (block 56), for example, by comparing the estimated states 54 to the measured states 44 over a number of servo sectors and verifying that the difference is within an acceptable margin.

If the state estimator fails the verification (block 58), the servo controller 24 generates a first interim velocity estimate (block 60) using the model-based open-loop deceleration control 55. If the first interim velocity estimate is greater than a threshold at block 62, then there is still a chance the state estimator 26 may be successfully re-qualified and so the flow diagram is repeated from block 34 in order to continue decelerating the head using the model-based open-loop deceleration control 55. However if the first interim velocity estimate is less than the threshold at block 62, it is assumed the state estimator 26 has entered an unrecoverable state and therefore the servo controller is re-initialized. In one embodiment, a second interim velocity estimate is generated based on a back electromotive force (BEMF) voltage of the VCM 50 (block 64) which is used to servo the head closed-loop in order to re-initialize the servo controller (block 66). The second interim velocity estimated may be generated in any suitable manner, such as by measuring a frequency of zero-crossings in the periodic BEMF voltage generated by the VCM 50.

If the state estimator passes the verification at block 58, the servo controller 24 switches from the model-based open loop control 55 to the closed-loop control 46 in order to seek the head to a target track (block 68) using the measured states 44 generated by reading the servo sectors as well as the estimated states 54 generated by the state estimator 26 if needed. Accordingly in this embodiment, when recovering from a servo fault the servo controller 24 shown in FIG. 2C may switch from the model-based open-loop deceleration 55 to the closed-loop control 46 before the velocity of the head reaches zero which may ameliorate the prior art drawbacks described above with reference to FIG. 4A.

Figure 4B:
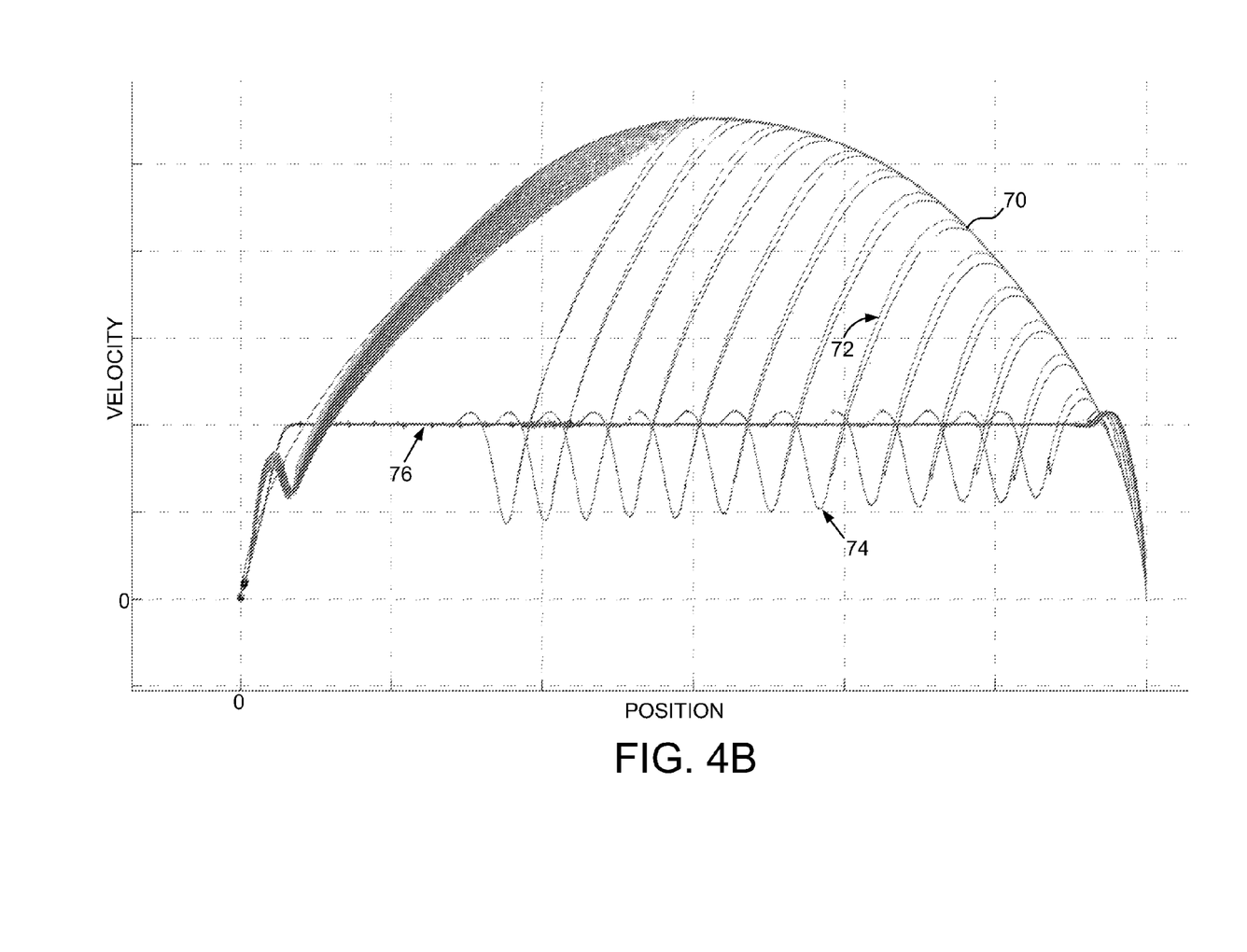
FIG. 4B shows an embodiment for recovering from a servo fault by decelerating the head using a model-based just-in-time (JIT) control and wherein the state estimator is re-qualified and verified before the head reaches zero velocity.

FIG. 4B shows example seek profiles (velocity/position phase plane) according to an embodiment when executing a seek operation which may be compared to the prior art seek profiles shown in FIG. 4A. If a servo fault occurs during a seek, for example, when the head reaches position 70, the servo controller switches to the model-based open-loop control 55 and begins decelerating the head along trajectory 72. While decelerating the head along trajectory 72, the servo controller may successfully re-qualify and validate the state estimator, and therefore switch to the closed-loop control 46. In the example of FIG. 4B, after switching to the closed-loop control 46 the servo controller may continue decelerating the head along trajectory 72 until the head reaches a first target velocity 74. When the head reaches the first target velocity (which is greater than zero), the servo controller may switch from decelerating the head to accelerating the head to a second target velocity 76 (a relatively low coast velocity), and then finish the seek operation by moving the head toward the target track at the coast velocity. The example embodiment shown in FIG. 4B for recovering from a servo fault may improve the performance of the disk drive by reducing resonance excitation and acoustic noise, improving seek settle, and/or avoiding command time-outs and an off-track writes.

In the embodiment of FIG. 4B, further improvements in servo fault recovery may be attained by designing the model-based open-loop control 55 to decelerate the head according to a model-based just-in-time (JIT) control. That is, the model-based open-loop control 55 may be designed so that the servo fault deceleration trajectories such as shown in FIG. 4B may follow an arcuate trajectory similar to a normal seek trajectory so as to avoid the sharp transitions in the prior art deceleration trajectories as shown in FIG. 4A. Similarly after the head decelerates to the first target velocity 74 in FIG. 4B, the acceleration trajectories for accelerating the head toward the coast velocity 76 may comprise a more arcuate, JIT type trajectory so as to further improve performance when recovering from a servo fault.

In the example embodiment of FIG. 4B, the servo controller recovers from a servo fault by decelerating the head to the first target velocity 74, and then finishes the current seek operation by seeking the head to the original target track of the seek. In another embodiment, the servo controller may recover from a servo fault by decelerating the head to the first target velocity 74, and then seeking the head to a different target track. This embodiment may be useful, for example, when the disk drive needs to perform an emergency operation such as parking the heads on a ramp during a free-fall event, or it may improve performance by allowing the current access command to be aborted in favor of a different access command (e.g., as determined by a rotational position optimization (RPO) algorithm).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks defined by servo sectors;
   a head; and
   a servo controller configured to servo the head over the disk based on an estimated state generated by a state estimator, wherein the servo controller is configured to execute a seek operation to seek the head over the disk and recover from a servo fault during the seek operation by at least:
   generating an initial state estimate of the head at the beginning of the servo fault;
   decelerating the head open-loop using a model-based deceleration control in response to the initial state estimate;
   while decelerating the head, re-qualifying the state estimator before the head reaches zero velocity; and
   after re-qualifying the state estimator and before the head reaches zero velocity, seeking the head to a target track closed-loop using the state estimator.

2. The data storage device as recited in claim 1, wherein the model-based deceleration control comprises a model-based just-in-time (JIT) control.

3. The data storage device as recited in claim 1, wherein the servo controller is further configured to recover from the servo fault by verifying the re-qualification of the state estimator.

4. The data storage device as recited in claim 3, wherein when the state estimator passes the verification, the servo controller is further configured to recover from the servo fault by seeking the head to the target track closed-loop based on the state estimator and the servo sectors.

5. The data storage device as recited in claim 3, wherein when the state estimator fails the verification, the servo controller is further configured to recover from the servo fault by:
   using the model-based deceleration control to generate a first interim velocity estimate of the head; and
   when the first interim velocity estimate of the head exceeds a threshold, continuing the decelerating of the head open-loop using the model-based deceleration control.

6. The data storage device as recited in claim 5, wherein when the first interim velocity estimate of the head is less than the threshold, the servo controller is further configured to recover from the servo fault by re-initializing the servo controller.

7. The data storage device as recited in claim 6, further comprising a voice coil motor (VCM) configured to actuate the head over the disk in response to a control signal generated by the servo controller, wherein the servo controller is further configured to recover from the servo fault by:
   generating a second interim velocity estimate of the head based on a back electromotive force (BEMF) voltage generated by the VCM; and
   re-initializing the servo controller based on the second interim velocity estimate.

8. A method of operating a data storage device, the method comprising:
   servoing a head over a disk based on an estimated state generated by a state estimator, and
   recovering from a servo fault during a seek operation by at least:
   generating an initial state estimate of the head at the beginning of the servo fault;
   decelerating the head open-loop using a model-based deceleration control in response to the initial state estimate;
   while decelerating the head, re-qualifying the state estimator before the head reaches zero velocity; and
   after re-qualifying the state estimator and before the head reaches zero velocity, seeking the head to a target track on the disk closed-loop using the state estimator.

9. The method as recited in claim 8, wherein the model-based deceleration control comprises a model-based just-in-time (JIT) control.

10. The method as recited in claim 8, further comprising recovering from the servo fault by verifying the re-qualification of the state estimator.

11. The method as recited in claim 10, wherein when the state estimator passes the verification, the method further comprises recovering from the servo fault by seeking the head to the target track closed-loop based on the state estimator and the servo sectors.

12. The method as recited in claim 10, wherein when the state estimator fails the verification, the method further comprises recovering from the servo fault by:
   using the model-based deceleration control to generate a first interim velocity estimate of the head; and
   when the first interim velocity estimate of the head exceeds a threshold, continuing the decelerating of the head open-loop using the model-based deceleration control.

13. The method as recited in claim 12, wherein when the first interim velocity estimate of the head is less than the threshold, the method further comprises recovering from the servo fault by re-initializing a servo controller.

14. The method as recited in claim 13, further comprising recovering from the servo fault by:
   generating a second interim velocity estimate of the head based on a back electromotive force (BEMF) voltage generated by a voice coil motor; and
   re-initializing a servo controller based on the second interim velocity estimate.

* * * * *